United States Patent [19]
Kennedy

[11] 4,116,104
[45] Sep. 26, 1978

[54] TOGGLE BOLT WING NUT RETAINER

[76] Inventor: Arvest Gethner Kennedy, 13130 Carriage Rd., Poway, Calif. 92064

[21] Appl. No.: 787,899

[22] Filed: Apr. 15, 1977

[51] Int. Cl.² ............................................. F16B 37/04
[52] U.S. Cl. ...................................................... 85/3 S
[58] Field of Search ................... 85/3 R, 3 S, 3 K, 66; 24/211 P, 211 R

[56] References Cited
U.S. PATENT DOCUMENTS

| 1,876,237 | 9/1932 | Jackson | 85/3 R X |
| 2,908,196 | 10/1959 | Apfelzweig | 85/3 R |
| 3,127,807 | 4/1964 | Modrey | 85/3 R |
| 3,285,118 | 11/1966 | Elkins | 85/3 R |
| 3,288,014 | 11/1966 | Mortensen | 85/3 R |
| 3,513,746 | 5/1970 | Forsberg | 85/3 R |
| 3,872,768 | 3/1975 | Ernst et al. | 85/3 R |

*Primary Examiner*—Ramon S. Britts
*Attorney, Agent, or Firm*—Brown & Martin

[57] ABSTRACT

A wing nut retainer comprises an elongated open box frame having a face plate with a pair of spaced apart fingers extending from the face plate for insertion into a blind bore, with a wing nut and toggle bolt in place in the retainer. The fingers grip the wing nut frictionally so that, upon withdrawal, the open wing nut is turned endwise for retrieval through the bore.

5 Claims, 5 Drawing Figures

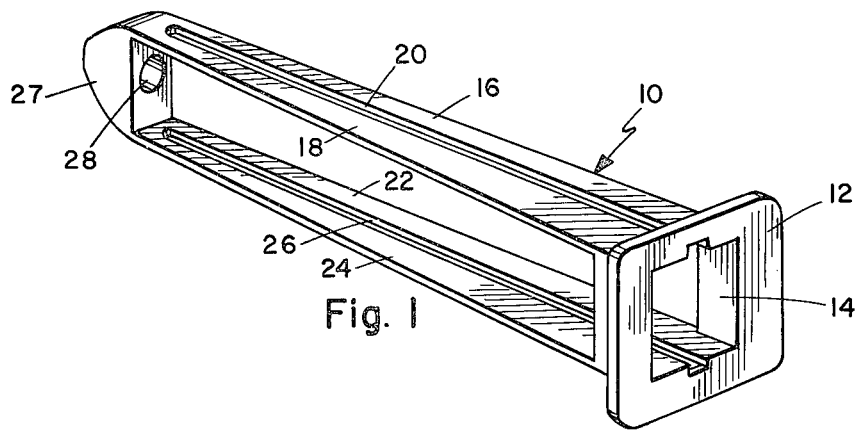
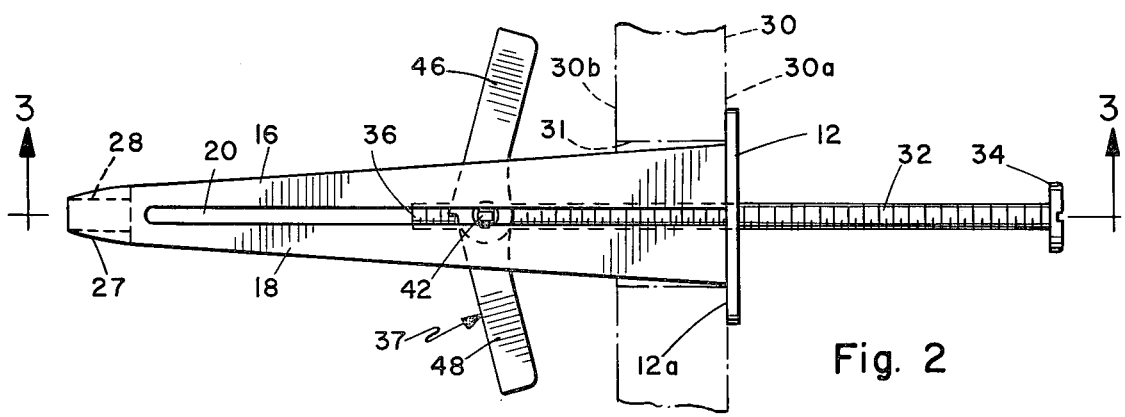
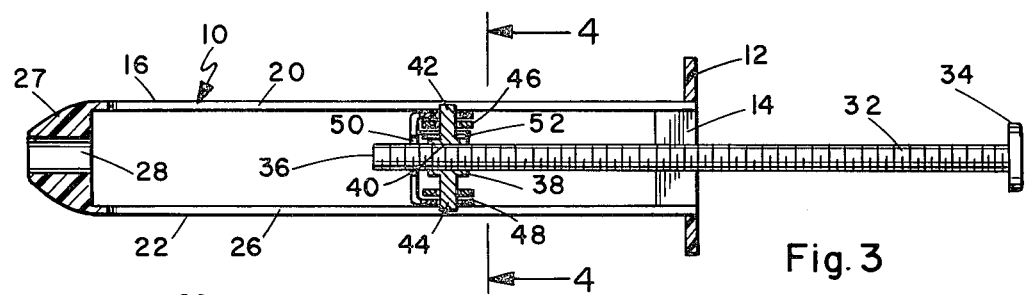
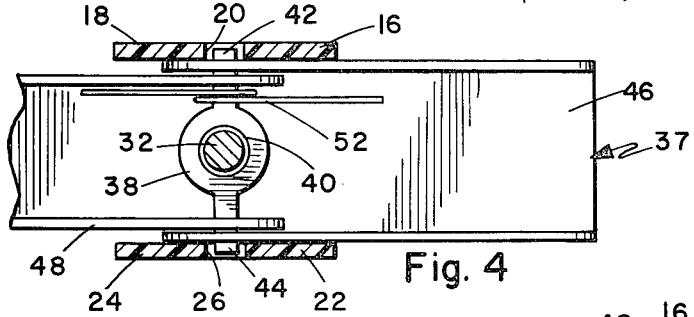
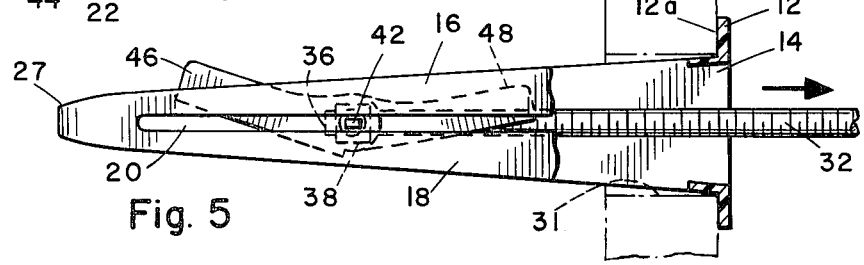

TOGGLE BOLT WING NUT RETAINER

BACKGROUND OF THE INVENTION

The present invention pertains to fastening means and pertains particularly to a toggle bolt wing nut retaining device.

Toggle bolts having expandable wing nuts are commonly used for attachment in blind bores in walls. Blind bores are typically bores in which access to the opposite side of the wall panel is not available for the worker to hold and retrieve nuts and the like for a bolt. Various types of lag bolts and so-called toggle bolts are available on the market. Such bolts typically have an expandable nut which is retained in a retracted or minimum diameter condition until inserted into the bore and is then expanded either automatically or by force to prevent the nut from pulling out through the hole. Such blind bores typically exist where a wall consists of spaced apart panels having a dead air space therebetween. Such wall structure exists in most homes and buildings today. The attachment of articles or fixtures to the walls for such buildings require the use of toggle bolts having wing nuts and/or some type of expandable nut.

Toggle bolts operate satisfactory in most situations. However, where it is necessary to remove the bolt or fixture and re-attach it, the wing nut is typically lost in the wall space. It is then necessary to obtain or use another wing nut. This becomes a problem where the attachment or the placement of fixtures on walls requires the removal and attachment of the fixture several times before final installation. Under such circumstances, a number of wing nuts are lost in the process. Such wing nuts are typically expensive because of the manufacturing complications thereof and the manufacturing processes required. A typical example is the expandable wing nut having a central nut portion and a pair of wings pivotally attached to the central nut portion and expandable outward into a maximum open condition by means of springs or the like. Such nuts cannot typically be removed from a wall structure once installed and also cannot be retained in place in the bore or behind the bore of the wall panel without the support of the bolt.

Accordingly it is desirable that some apparatus be available for retaining the wing nut in place and retrieving the wing nut when desirable.

SUMMARY AND OBJECTS OF THE INVENTION

Accordingly it is the primary object of the present invention to overcome the above problems of the prior art.

Another object of the present invention is to provide a wing nut retaining means for retaining wing nuts in place behind the wall panels.

A further object of the present invention is to provide a wing nut retaining and retrieving device for permitting the retaining and retrieving of wing nuts from behind a wall panel.

In accordance with the primary aspect of the present invention, an open box frame retainer has a pair of fingers which extend through and behind a bore in parallel spaced apart relation for retaining a wing nut therebetween. The fingers engage the wing nut in such a manner that the nut is pivotal to a position for removal from the bore.

BRIEF DESCRIPTION OF THE DRAWINGS

The above and other objects and advantages of the present invention will become apparent from the following description when read in conjunction with the drawings, wherein:

FIG. 1 is a perspective view of the retainer for holding a wing nut of a toggle bolt.

FIG. 2 is a top plan view of a toggle bolt and retainer assembly.

FIG. 3 is a sectional view taken on line 3—3 of FIG. 2.

FIG. 4 is an enlarged sectional view taken on line 4—4 of FIG. 3.

FIG. 5 is a top plan view, partially cut away, showing the withdrawal action of the toggle.

DETAILED DESCRIPTION OF THE DRAWING

Turning to FIG. 1 of the drawing, a retainer in accordance with the present invention is generally designated by the numeral 10. This retainer generally comprises an open box frame structure, with a face plate 12 having a generally rectangular aperture 14 therethrough. A pair of elongated finger like guide rails extend perpendicular to the face of the plate for extending into a bore for engaging and retaining a wing nut of a toggle bolt. As shown in FIG. 1, the upper finger includes a pair of spaced rails 16 and 18 spaced apart by a guide slot 20 extending therebetween. A lower finger comprises a pair of guide rails 22 and 24 having a guide slot 26 therebetween. The fingers extend outward and terminate in an end defined by a nose like portion 27 connecting the outer ends of the fingers together, to facilitate insertion of the retainer into a bore in a wall. The nose portion 27 preferably has a bore 28 extending therethrough for receiving the end of the toggle bolt. The length of the fingers and nose are such as to extend beyond the back surface of a wall panel sufficient to permit the length of a wing nut to be accommodated therein as will be explained later.

Turning now to FIG. 1, the face plate 12 includes a back face 12a for engaging the outer surface of a wall panel 30. The wall panel includes a bore 31 extending therethrough. The outer face 30a is engaged by the face 12a of the face plate 12. The opposite side of the wall 30b is assumed to be a blind or hidden face inaccessable to a worker. This will typically be a back or inner facing defining a air spaced between two spaced apart wall panels as in typical housing construction.

Illustrated in FIGS. 2 through 5, is one form of toggle bolt construction which the present invention is designed to accommodate. The toggle bolt includes an elongated screw or bolt 32 having a head 34 and a forward end 36, with an expandable wing nut 37 is threaded thereon.

The wing nut 37 is of well known type and comprises a central nut portion 38 having a threaded bore 40 concentric with and defining a screw axis, and includes a pair of hinge pins 42 and 44 extending transverse or at right angles to the screw axis for defining pivot pins and a pivotal axis for the wings of the nut. A pair of separate wings 46 and 48 comprise generally channel shaped members pivotally mounted on the hinge pins 42 and 44 of the central nut. The outer wing 46, as best seen in FIGS. 3 and 4 has a greater width than and fits over the inner wing 48. This difference in width of the wings provides a significant feature for retrieval of the nut as will be described later. The wings also each include a semicircular cut-out portion 50 to allow the screw 32 to pass through the open wing nut. The wings are biased outward to their spread position by means of a spring 52 as best seen in FIG. 4, which winds around the pin 42 with a coil and having the ends that extend into engagement with each of the respective wings 46 and 48 for biasing to the outward position, as shown in FIG. 2. The wings can be folded inward into a position extending along parallel to one another along the shank of the bolt 32. In this configuration the wings may be inserted through a hole in a wall such as that at 31 in wall 30. Similarly the wings can be inserted through the bore 14 in face plate 12 of the retainer 10. Once the wing nut has extended beyond the bore or aperture, the wings are biased to their spread position, as shown in FIG. 2.

The rails or fingers of the retainer are dimensioned to engage the upper and lower surfaces of the wing nut as shown in FIGS. 3 and 4. As best seen in FIG. 4, the rail members 16 and 22 engage the wing 46 in substantially tight frictional engagement thereof at the upper and lower surfaces. However, the wing 48 is not engaged by these rails or the other side rails 18 and 24. This added friction on one side of the wing 46 with respect to the pivot point thereof tends to pivot the wing about the pivot axis of hinge pins 42 and 44 when the wing is forced along the rails from one end to the other. Pivoting of the wing is prevented when bolt 32 extends through and between the wings 46 and 48. When the bolt is retracted to a position such that the end 36 falls short of the cut-out 50, the wings are permitted to rotate about the pivot axis defined by pins 42 and 44 into a position as shown in FIG. 5. This permits a retraction and removal of the nut from the bore behind the wall 30 as seen in FIG. 2. In order to retract the nut, the nut is pushed sufficiently far from the wall surface 30b into the retainer 10, to permit the wings of the nut to pivot clear of the wall 30. Thereafter the bolt 32 is retracted such that the end 36 does not protrude beyond the wings 46 and 48. Then the bolt is simply pulled in a direction of the arrow shown in FIG. 5, causing the wing nut to pivot because of the frictional drag on wing 46, thus forcing the wing nut to orient itself endwise in this position for removal from the bore 31.

Thus the wing nut may be inserted into and removed from the bore in the wall any number of times without becoming lost, by using the retainer member 10. The wing nut can be extracted still attached to the bolt, with or without removal of the retainer. In addition the bolt itself may be removed from the bore with the nut staying retained in its position by the retainer 10. Thus the bolt can be reinserted and engaged with the nut. Without the retainer, it would be impossible to retrieve the wing nut 37 because of its transverse extending position as shown in FIG. 2. Additionally, if the bolt 32 were removed from the nut, the nut would fall away from the back side of the wall 30 and would become lost. Additional wing nuts would be necessary in order to reinstall the bolt 32.

While the present invention has been described and illustrated by means of a single embodiment, it is to be understood that numerous changes and modifications may be made therein without departing from the spirit and scope of the invention as defined in the appended claims.

Having described my invention, I now claim.

1. A wing nut retainer adapted for use in combination with a toggle bolt and a wing nut having a pair of interconnected wings pivotally mounted on a hinge pin on a central nut member for pivoting about an axis transverse to the axis of the bolt, comprising:
   a face plate having an aperture therethrough being of a size for the insertion and removal therethrough of a toggle bolt and wing nut mounted thereon when the wings of said nut are oriented along the axis of said bolt:
   a pair of guide rails extending from one side of said plate and spaced apart for receiving a wing nut therebetween and including opposed faces defining frictional means for frictionally engaging a single one of the wings of said wing nut off center of the pivotal axis thereof for pivoting said wings about said transverse axis for alignment parallel to the axis of said bolt when moved along between said rails for insertion into and removal from said aperture, and each of said rails including a substantially straight hinge pin receiving slot extending the length thereof and entend entirely through said face plate for retaining said wing nut in position therebetween upon removal of the bolt therefrom.

2. The retainer of claim 1, wherein said aperture is generally rectangular.

3. The retainer of claim 1, wherein said rails have a length sufficient to accommodate the full length of a wing nut between the forward end thereof and a wall through which said retainer extends.

4. The retainer of claim 1 wherein said guide rails have inner ends connected to said face plate an outer ends connected together by a nose member,
   said guide rails have a length sufficient to permit a wing nut to rotate about its pivot axis between said nose member and a wall through said retainer is extended.

5. A retainer according to claim 1 including a nose member connecting said guide rails togethers at the outer end thereof.

* * * * *